Dec. 10, 1968  T. J. LOFTUS  3,415,479
GIMBAL STRUCTURE
Filed Nov. 4, 1966

United States Patent Office 3,415,479
Patented Dec. 10, 1968

3,415,479
GIMBAL STRUCTURE
Thomas J. Loftus, Erie, Pa., assignor to Lord Corporation, Erie, Pa., a corporation of Pennsylvania
Filed Nov. 4, 1966, Ser. No. 592,185
8 Claims. (Cl. 248—358)

ABSTRACT OF THE DISCLOSURE

In a gimbal structure having a plurality of nested gimbal frames and associated means for journaling diametral portions of each individual gimbal frame on the adjacent gimbal frame, the rigidity, and therefore the accuracy, is increased by supporting the structure as a whole by a resilient free-free support for bearings of diametral portions of the outermost gimbal frame and located on an axis passing through the center of gravity of the structure. The free-free support also serves as a vibration isolating mounting for the gimbal structure.

---

This invention is intended to decrease the weight of gimbal structures without sacrificing accuracy and at the same time protect the structure from vibration.

Gimbal structures are used in gyroscopes, radar, stable platforms, and other control systems where isolation from vibration is desired so the vibration will not introduce error signals. Many of the uses are in aircraft and space vehicles where weight saving is important. Gimbal structures comprise a plurality of nested gimbal frames and associated means for journaling diametral portions of each individual gimbal frame on the adjacent gimbal frame.

By the structure of this invention, diametral portions of the outermost gimbal frame are each journaled in a bearing structure on an axis passing through the center of gravity of the gimbal structure and resilient means support the bearing structures and provide a substantially free-free support for said diametral portions of the outermost gimbal frame. The concept of the free-free support does not require any change in the design of the gimbal structure. The only change is in the mounting of the outermost gimbal frame which of course in turn supports the inner frame or frames.

By the free-free mounting system between the outermost gimbal frame and the supporting structure, the gimbal structure behaves as a free-free beam which is nearly five times as stiff as the same gimbal structure in which the bearings for the outermost gimbal are rigidly mounted. The mounting system in addition to providing vibration isolation decreases errors due to flexure of the component parts of the gimbal structure. Stated differently, if the improvement in accuracy is not desired, the components of the gimbal structure may be made of lighter weight and more flexible material and yet give the same accuracy of response as a heavier, more rigid construction.

Figure 1:
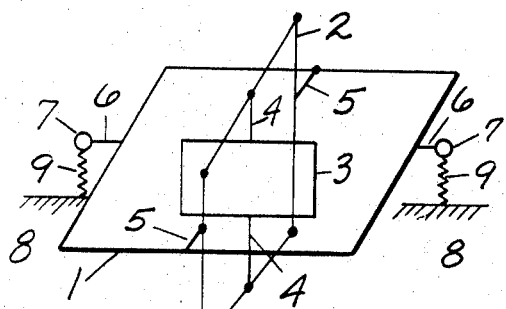
Figure 3:
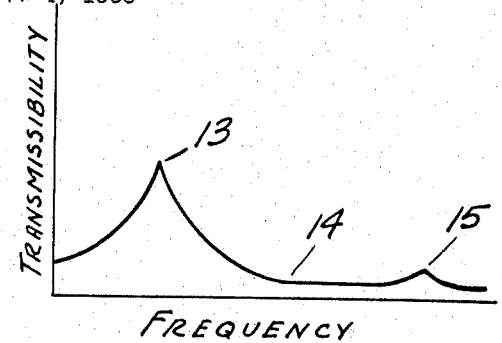
Figure 4:
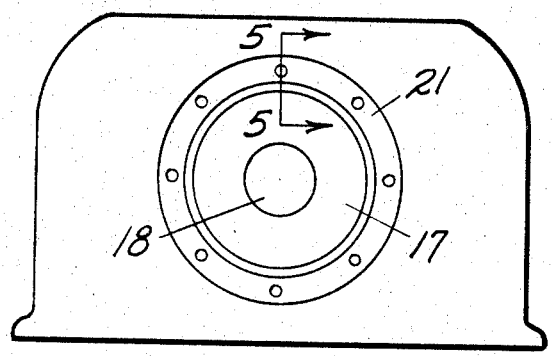
Figure 2:
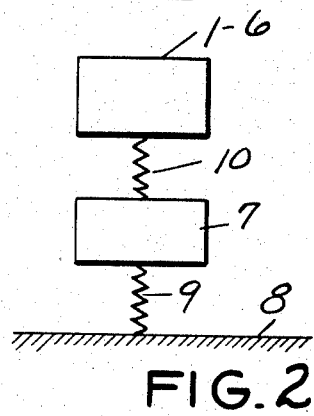
Figure 6:
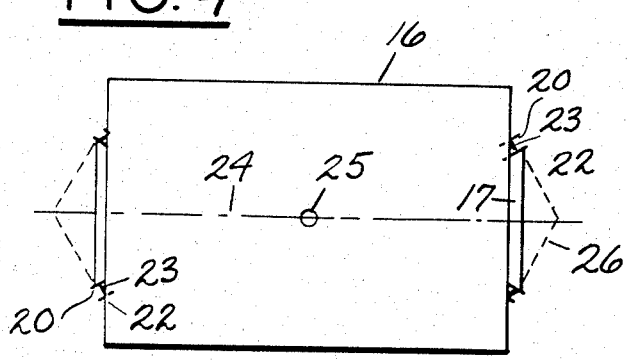
Figure 5:
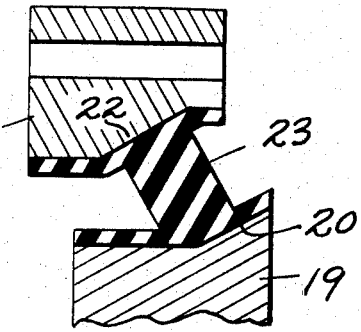
Figure 7A:
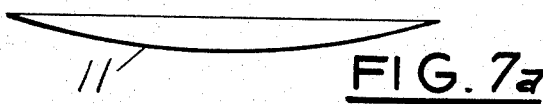
Figure 7B:
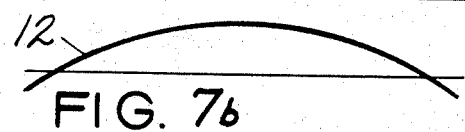

In the drawing, FIG. 1 is a diagrammatic view of a gimbal structure, FIG. 2 is a diagram illustrating the operation, FIG. 3 is a performance curve, FIG. 4 is an end view of a gyroscope housing, FIG. 5 is a section on line 5—5 of FIG. 4, FIG. 6 is a diagrammatic side view of the gyroscope housing, FIG. 7a is a diagram of the first mode of a simply supported beam, and FIG. 7b is a diagram of the first mode of a free-free beam.

The invention is shown applied to a three gimbal structure comprising nested outermost, intermediate and inner gimbal frames 1, 2 and 3 on mutually perpendicular axes. The three gimbal structure was selected as illustrative. The number of gimbals is not important. Sometimes a fourth or redundant gimbal frame is used as the outermost gimbal frame to increase the accuracy, in which case the axis of the outermost gimbal frame coincides with the axis of one of the inner gimbal frames. Other gimbal structures have two gimbal frames. The principles are not affected by the number of gimbal frames. The inner gimbal frame 3 has diametral trunnions 4 journaled in the intermediate gimbal frame 2. The intermediate gimbal frame 2 has diametral trunnions 5 journaled in the outermost gimbal frame 1 and the outermost gimbal frame 1 has diametral trunnions 6 journaled in bearings 7 fixed in a suitable supporting frame or structure not shown. The rotor of a gyroscope might be journaled in the inner gimbal frame 3.

Between the bearings 7 and the supporting structure 8 are arranged springs 9 which are preferably dynamically matched so that the elastic center of the composite structure supported by the springs 9 substantially coincides or is close to the center of gravity of the composite structure. Since the gimbal structure shown has three mutually perpendicular axes, the spring rates of the springs 9 may be selectively chosen for the desired response along each of these three axes and the elastic center of the springs along each of these three axes passes through the center of gravity of the composite structure. The elastic center is the point at which a single spring can replace all springs in a system without changing the response. For example, two springs of equal stiffness spaced equal distances on opposite sides of a point can be replaced by a single spring at that point. When the elastic center and center of gravity coincide, inertia forces which always act through the center of gravity also act through the elastic center and do not introduce couples. This minimizes error due to the springs. The location of the elastic center is effected by dynamic matching or selecting the relative stiffness of the springs. The natural frequency of the parts 1–7 inclusive on the springs 9 is chosen with relation to vibration frequencies to be isolated in accordance with the usual principles. That is, the natural frequency of the device as a whole on springs 9 is sufficiently lower than the frequency of vibration to be isolated that the desired degree of vibration isolation is achieved.

In addition to the natural frequency of vibration of the device as a whole on the springs 9, the natural frequency of the gimbal structure itself must be considered. This is diagrammatically illustrated in FIG. 2 where the parts 1–6 are shown supported by a spring 10 on the bearings 7 for the trunnions 6 of the outermost gimbal 1. The spring 10 is not identifiable as such but consists of the parts 1–6 supported by the bearings 7. When the bearings 7 are attached directly to the supporting structure 8, the gimbal structure 1–6 is substantially a simply supported or "hinged-hinged" beam and its first mode of transverse or bending vibrations is diagrammatically shown at 11 in FIG. 7a and has a frequency given by the formula:

$$\text{frequency} = 9.87 \sqrt{\frac{EI}{\mu_1 l^4}}$$

where $EI$ is the bending stiffness of the beam section, $l$ is the length of the beam, $\mu_1$ is the mass per unit length. When the bearings 7 are supported by springs 9, the gimbal structure 1–6 is substantially a free-free beam and its first mode of transverse or bending vibrations is diagrammatically shown at 12 in FIG. 7b and has a frequency given by the formula:

$$\text{frequency} = 22 \sqrt{\frac{EI}{\mu_1 l^4}}$$

By use of springs 9, the frequency of the flexural or bending vibration of the gimbal structure is increased by a factor of 22/9.87 or 2.2. This means that the effective stiffness of the gimbal structure is theoretically 4.84 times $(2.2)^2$ what it would be if the bearings 7 were supported directly on the supporting structure 8. So far as the accuracy of the gimbal structure is concerned, the springs 9 have increased the effective rigidity of the gimbal structure nearly five fold and at the same time have protected the gimbal structure from error signals due to vibration. In cases where the five fold effective increase in stiffness of the parts of the gimbal structure is not necessary, the gimbal parts may be made of lighter and more flexible material without degrading the performance. This is an important factor in aircraft and space environments.

The vibration isolation effect of the springs 9 causes the gimbal structure 1–7 to move bodily in the direction of the vibration but a lesser amount than the vibration input. The stiffening effect of the springs 9 results in less flexing of the gimbal frame. Since the stiffness of the gimbal frame structure is proportional to the ratio of its moment of inertia to its weight, it is not possible to achieve the stiffening effect of the springs 9 in a gimbal structure of like material occupying the same space envelope and of the same material.

Referring to the performance curve in FIG. 3, peak 13 indicates the natural frequency of the parts 1–7 inclusive on the springs 9. At this frequency, the transmissibility of vibration is multiplied or increased and this frequency is, accordingly, below any vibration frequency to be experienced. The section of the curve indicated by the numeral 14 is in the vibration isolation region where the transmissibility of vibration is only a fraction of the input. Numeral 15 indicates the natural frequency of vibration of the gimbal structure 1–7 as a free-free beam. Since this natural frequency occurs in the vibration isolation range, even though there is an amplification, the amplification is of the isolated vibration and the peak 15 is still only a fraction of the vibration input.

FIGS. 4, 5 and 6 show a preferred mounting system for a three axis gyro suspension system. In FIG. 4, the housing 16 for the gyro system has at opposite ends bearings 17 for the trunnions 18 of the outermost gimbal frame of the gyro gimbal structure, for example that shown diagrammatically at 1 in FIG. 1. Fixed to the bearing 17 is a ring 19 having an outwardly presented conical surface 20. Surrounding the ring 19 is a ring 21 fastened to the housing 16 and having an inwardly presented conical surface 22. An annular body 23 is sandwiched between and bonded to the opposed conical surfaces 20, 22. As shown in the diagrammatic view, FIG. 6, the mountings are located on the trunnion axis 24 of the outermost gimbal frame and are spaced equal distances from the center of gravity 25 of the gimbal structure. The mountings have principal axes 26 normal to the surfaces 20, 22 and by reason of the inclination of the conical surfaces 20, 22, the mountings provide a support for the gimbal structure which is projected axially outward of the bearings 17 as indicated by the lines 26. The mountings resist tilting or rocking of the gimbal structure as though physically displaced outward from the ends of the housing 16. This increases the stability of the mounting system. As is usual, the axis of trunnion axis 24 of the outermost gimbal frame is substantially through the center of gravity 25 of the gimbal structure. The cross section of the bodies 23 may be chosen so the stiffness in directions radial to the trunnion axis substantially equals the stiffness along the trunnion axis. Also, the stiffness of the body 23 at one end of the housing is matched with or is substantially equal to the stiffness of the body 23 at the opposite end of the housing. This makes the elastic center of the mounting system coincide with the center of gravity 25 of the gimbal structure.

The design of gimbal structures is subject to conflicting requirements. Since the gimbal frames rotate, light weight is desirable to decrease the inertia. Accuracy requires rigidity with the associated heavy weight. By providing a free-free support for the outermost gimbal frame, the effective rigidity of the gimbal structure is increased so the gimbal frames may be made of lighter weight and more flexible material without sacrificing accuracy.

Vibration may introduce error by causing movement of the gimbal structure in the direction of the vibration. This movement is minimized by isolation of the gimbal structure from the vibration. Vibration can also introduce error by exciting flexural vibration of the gimbal frames. This type of error is most serious in the outermost gimbal frame which, by reason of its position, inherently is the largest and has the largest unsupported span. Flexural vibration has been minimized by increasing the section of the gimbal frames to increase rigidity. This caused an objectionable weight increase. Instead of increasing the section, a greater increase in rigidity can be obtained by a free-free support for the trunnions of the outermost gimbal frame. The free-free support increases the rigidity of the gimbal structure far more than would be possible by merely increasing the section of the gimbal frames. The same resilient mountings which provide the free-free support also isolate vibration. In a free-free support, both supported ends of the outermost gimbal frame are free to assume the general shape shown in FIG. 7b. It is not necessary that the support be ideally free-free. Substantial advantages are obtained when there is substantial deviation from the ideal free-free support.

What is claimed as new is:

1. In combination with a gimbal structure for gyroscopes, inertial platforms, radar and the like, the gimbal structure having a plurality of nested gimbal frames and associated means for journaling diametral portions of each individual gimbal frame on the adjacent gimbal frame, the outermost gimbal frame having diametral portions with an axis substantiallly through the center of gravity of the gimbal structure, a bearing structure in which each of the diametral portions of the outermost gimbal frame is journaled, supporting means, and resilient means between said supporting means and said bearing structures for providing a substantially free-free support for said diametral portions of the outermost gimbal frame, the elastic center of the gimbal structure on said resilient means being substantially coincident with the center of gravity of the gimbal structure.

2. The combination of claim 1 in which the resilient means comprise a plurality of spring elements spaced along and concentric with an axis substantially through the center of gravity of the gimbal structure.

3. The combination of claim 2 in which the spring elements comprise elastomeric sandwiches having a body of elastomer sandwiched between and anchored to opposed surfaces respectively on said supporting means and said bearing structure, said surfaces being radially outward of said axis and normal to inclined lines extending from a point on said axis outside the bearing structures.

4. The combination of claim 3 in which said opposed surfaces are substantially conical with respect to said axis.

5. The method of decreasing the weight of a gimbal structure for gyroscopes, inertial platforms, radar and the like without sacrifice of accuracy, the gimbal structure having a plurality of nested gimbal frames and associated means for journaling each individual gimbal frame on the adjacent gimbal frame and further having diametral bearing structures in which the outermost gimbal frame is journaled, said method comprising the steps of reducing the rigidity of the gimbal frames below that required for the desired accuracy when the diametral bearing structures are rigidly supported and increasing the effective rigidity of the gimbal frames by resiliently supporting said diametral bearing structures to provide a free-free resilient supporting means for said gimbal structure.

6. The method of claim 5 in which the elastic center of the parts supported by said resilient means is substantially coincident with the center of gravity of said parts.

7. The method of claim 6 in which the resilient means has substantially equal stiffness in all directions through the center of gravity of the parts supported by the resilient means.

8. The method of claim 5 in which the resilient supporting means has principal axes of greatest stiffness converging on said axis outside said bearing structures.

References Cited

UNITED STATES PATENTS 2,246,738 6/1941 Lauck _____ 74—5.5 XR
3,260,123 7/1966 Dickie _____ 74—5.5

ROY D. FRAZIER, *Primary Examiner.*

ROBERT P. SEITTER, *Assistant Examiner.*

U.S. Cl. X.R.

74—5.5